United States Patent [19]
Megumi

[11] 3,978,916
[45] Sept. 7, 1976

[54] STRUCTURAL UNIT BODY HAVING A PIPE INCORPORATED THEREIN AND A STRUCTURE ASSEMBLED THEREFROM

[75] Inventor: Naomitsu Megumi, Funabashi, Japan

[73] Assignees: Tokyo Plywood Kabushiki Kaisha, Tokyo; Naomitsu Megumi, Funabashi, both of Japan

[22] Filed: Apr. 24, 1975

[21] Appl. No.: 571,111

Related U.S. Application Data
[62] Division of Ser. No. 420,399, Nov. 30, 1973.

[30] Foreign Application Priority Data
Dec. 7, 1972  Japan .............................. 47-122690
Mar. 10, 1973  Japan .............................. 48-32280

[52] U.S. Cl. ................................. 165/49; 165/168; 165/53; 165/76
[51] Int. Cl.² ......................................... F24H 9/08
[58] Field of Search ................. 165/53, 56, 76, 169, 165/49, 168; 52/612, 405, 406, 727, 600, 601, 434, 485, 486, 489, 267, 268, 269, 503, 504, 587, 606

[56] References Cited
UNITED STATES PATENTS
1,879,319  9/1932  Kleitz ................................. 52/405
2,089,045  8/1937  Venzie ............................... 52/606
3,319,983  5/1967  Zibell ................................. 52/489
3,676,973  7/1972  Kellert ............................... 52/601
3,897,820  8/1975  Teeter, Jr. .......................... 165/56

FOREIGN PATENTS OR APPLICATIONS
1,022,780  1/1958  Germany ............................ 165/53

*Primary Examiner*—Albert W. Davis, Jr.
*Assistant Examiner*—James D. Liles
*Attorney, Agent, or Firm*—Frank J. Jordan

[57] ABSTRACT

A plurality of structural unit bodies are utilized to construct by suitably assembling the unit bodies. Each structural unit body comprises an outer flange and an inner flange extending from one end edge and the other end edge respectively of a box-shaped frame. A stuffed box is secured to the surface of the inner flange and the stuffed box is in the form of a flat box made of a dampproof material. The stuffed box is covered on the outside with a metal net-like material and has disposed therein a pipe capable of passing fluid therethrough. The box is stuffed with noncombustible materials. The upper portion of the middle section of the frame, the inside flange surface and the entire surface of the stuffed box is plastered or covered with mortar whereby there is formed a circumferential groove between the outer flange and the underside of the mortar.

5 Claims, 5 Drawing Figures

STRUCTURAL UNIT BODY HAVING A PIPE INCORPORATED THEREIN AND A STRUCTURE ASSEMBLED THEREFROM

This is a division of application Ser. No. 420,399, filed Nov. 30, 1973.

BACKGROUND OF THE INVENTION

This invention relates to a structural unit body having a pipe incorporated therein and adapted for use in conjunction with the interior and exterior finishing of a structure such as a wall and floor and to a structure assembled utilizing such structural unit bodies.

The structural unit body of this invention comprises a flat box made of a dampproof material and having its outside covered with a metal net. The inside of the box is provided with a pipe permitting the passage of liquid and gas therethrough. The box is stuffed with a noncombustible material which encloses the pipe and the box is fixed to a frame. The whole of the frame except for a part thereof is plastered with or has applied thereto cement mortar. The present invention also relates to a structure assembled of the aforementioned structural unit bodies each having a pipe incorporated therein and which are connected to each other. One of the objects of providing a structural unit body having the pipe incorporated therein and the structure assembled with such structural unit bodies as to provide for the control of room temperature by passing hot water, cold water or hot air or cold air through the pipe incorporated into the unit body. This arrangement not only provides comfortable dwellings and structures that are adaptable to environmental conditions because they are less influenced by temperature and moisture from the outside while providing sound insulation properties, but also this arrangement is strong and durable because it is fireproof, resilient and solid.

A description will hereinafter be set forth of an embodiment of this invention with reference to the accompanying drawings.

SUMMARY OF THE INVENTION

A structural unit body includes a frame having an inner flange and an outer flange. The frame has an opening which is circumscribed by the inner flange. A stuffing box in which a noncombustible material is disposed is secured to the frame to thereby close off the opening in the frame. Cement mortar is disposed on at least portions of the stuffing box and the frame and conduit means are disposed within the stuffing box for conducting a fluid, whereby heating and cooling of a structure made from such unit bodies may be effected by the fluid passing through the conduit means.

DESCRIPTION OF THE PREFERRED EMBODIMENTS

Figure 1:
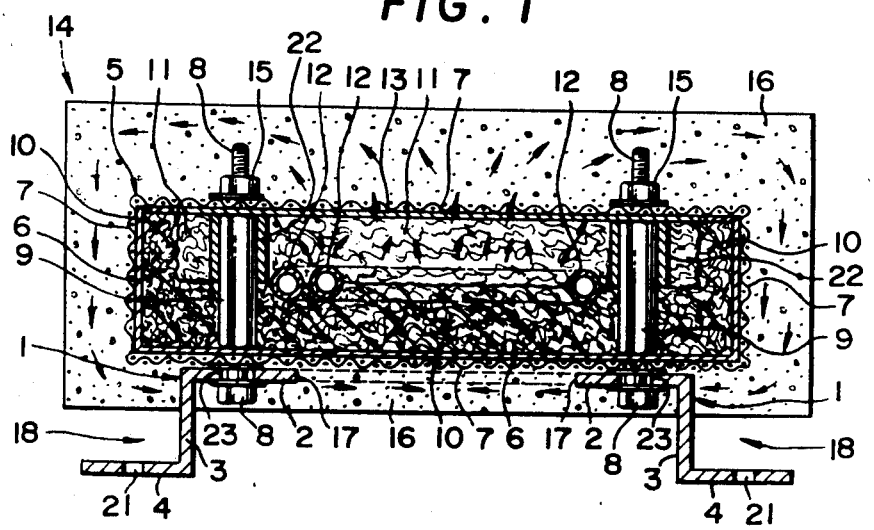
FIG. 1 is a cross sectional view of a structural unit body according to one embodiment of the invention.
Figure 2:
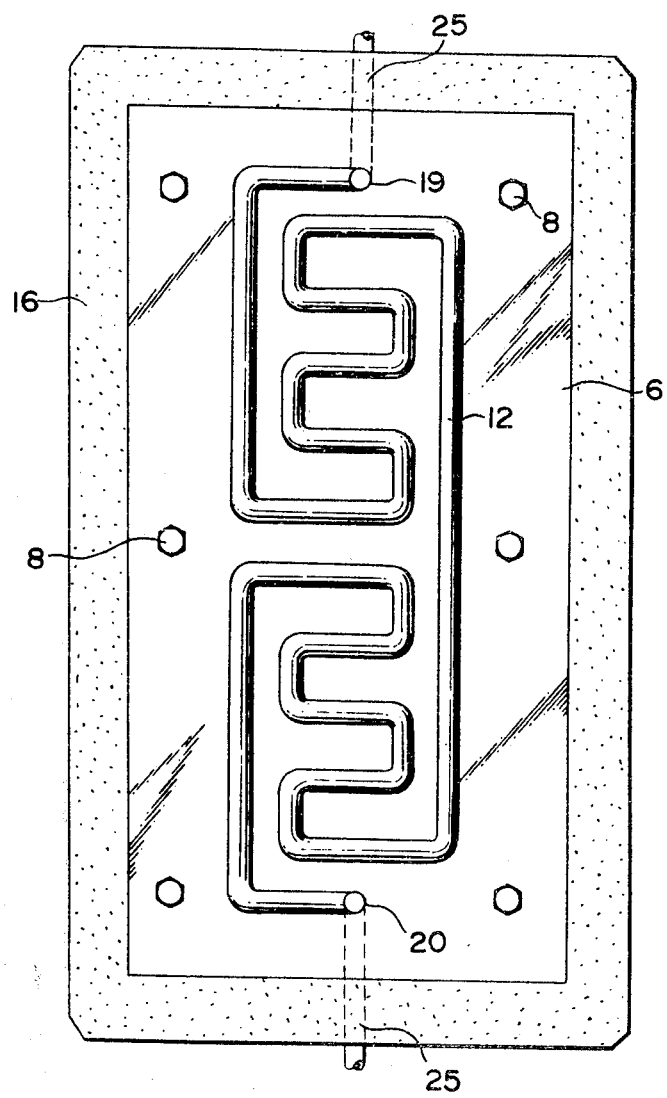
FIG. 2 is a schematic plan view showing an example of the arrangement of the piping inside the structural unit body.

Referring now to the drawings and particularly to FIGS. 1 and 2, there is shown in section in FIG. 1 an embodiment of a structural unit body of the invention wherein a pipe is incorporated therein. An outwardly facing outside flange 4 and an inwardly facing inside flange 2 are arranged in stepwise manner and integrally formed on the inner end edge and the outer end edge respectively of a box-shaped square frame plate 3 made of a metal or other noncombustible hard material, to thereby form a stepped frame 1 having an opening 17 formed on the top by the inside flange 2. The outside flange 4 forms the circumference of the bottom and defines a flat base. Because the inside flange 2 is flat on the top and because there is the opening 17, the flange is provided with fasteners such as bolts 8 and nuts 15. There is provided a square flat box 6 having a cover 13 and both made of dampproof paper, hard board, particle board or the like. The surfaces of the box 6 and cover 13 are covered with a metal net-like material 7, and a pipe 12 permitting the passage of fluid therethrough such as a liquid and gas is disposed inside the box 6. Because it is desirable that the surface area of the pipe 12 be as large as possible inside the box, one of the methods of increasing the surface area is to lay the pipe in a zigzag manner as shown in FIG. 2. The positions of the inlet 19 and outlet 20 of the pipe 12 may be suitable arranged as desired but are preferably in the neighborhood of opposing edges. The box is stuffed with noncombustible materials 10 and 11 such as inorganic fibers, mineral fibers thereof and felt-like material, and the pipe 12 is enclosed with the noncombustible materials. In this case, when the stuffing material 10 on the horizontal underside of the pipe 12 is made thick and the stuffing material 11 on the upperside is made coarse, or an asbestos nonwoven fabric is placed on the underside and a material such as glass wool is placed on the upper side, an efficient heat transfer effect is obtained. The stuffed box constructed in this manner and indicated generally at 5 is tightly fixed to the surface of the inside flange 2 by fasteners 8, 15 and 9, and the opening 17 is thereby closed. Cement mortar 16 is disposed or plastered in a specified shape over the entire surface from the upper part of the middle of the flange plate 3 to the inside frame 2, over the fasteners and metal net-like material 7 to fix them and to thereby construct and provide a structural unit body 14 having the pipe incorporated therein. In the structural unit body thus constructed, the outside flange 4 of the frame plate 3 and the bottom surface of the cement mortar 16 define a space therebetween to thereby form a circumferential groove 18 about the entire circumference of the unit body, and accordingly, the circumferential groove permits the fitting of a connection plate thereinto as will hereinafter be described. The outside flange 4 serves as a base and the unit body is secured to a wall and floor through the fitting holes 21 in the outside flange 4.

In the structural unit body, it is possible to make a frame by a pressing operation in which one whole iron sheet is stamped out with the frame integrally having a means to connect the outer flange 4 having the fitting holes 21 formed therein and the frame plate 3 and forming therewith the inner flange 2 having bolt holes 23 for bolts 8 in a square shape. Alternatively provision may be made to weld the outside frame 4 and the flange plate 3 in a square shape and having the opening 17. The noncombustible materials 10 and 11 may include lightweight materials such as vermiculite and pearlite, in addition to those materials previously mentioned. The metal net-like material 7 may be an iron sheet having a plurality of holes and grooves formed therein formed by a punching out operation or the net-like material 7 may be a woven wire material. Since the outside cement mortar 16 may be fixed with or to the exposed portion of the net-like material 7 and the inside flange used as steel bars for reinforcement, the mortar 16 is fortified and thereby secured in place. The nuts or sleeves 9 fitted over the bolts inside the box 6 and pipes 22 therein are effective for keeping the shape of the inside hollow part of the box and preventing the box from being crushed or deformed by depressing. In this manner, the unit body in which no frame 1 is used becomes a plate-like block and can be assembled where necessary.

A description will now be set forth of another embodiment of the invention. With reference to the unit body in FIG. 3 which also has a pipe incorporated therein, like reference characters are used for like parts, because the main body reinforced with cement mortar 16 is the same as in the previous embodiment, and it is not deemed necessary to repeat the description of like parts. Accordingly, such description will be omitted. The difference in structure between the two embodiments lies in the frame.

Namely, a frame 31 in this second embodiment is constructed in a manner such that one side edge of a metal sheet having a plurality of holes 32 regularly or irregularly formed therein is bent in a right-angled, L-shape manner so that the edge is formed into an inwardly extending inside flange 36 and the other side edge is formed into an outside frame 38 bent into a U-shaped box-like shape 34, the box-like shape member being stuffed with a resilient buffer material 33 to thereby form a stepped base 35. A square frame 31 integrally having the inside flange 36, side walls 37 and outside flange 38 is formed by the base 35 which is assembled into a square shape, and an opening 39 is formed in the middle of the inside flange 36 by the circumferential edge of the inside flange 36. The frame 31 constructed in this manner is fixed by fasteners 8 to the stuffed box 5 in the same manner as in the previous embodiment to thereby construct a structural unit body 40 having a pipe incorporated therein. This unit body is also formed with a circumferential groove 18 on the circumference between the outside flange 38 and the mortar 16 in the same manner as in the previous embodiment. Since the outside flange 38 serves as feet through which the unit body is fixed or secured to structures, the flange 38 is formed with fitting holes 42 for fasteners 41.

Figure 3:
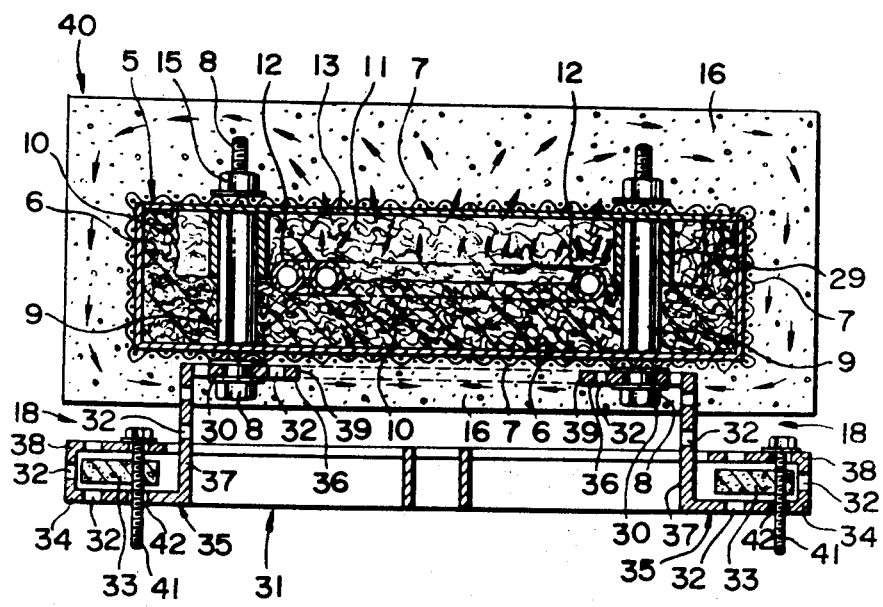
FIG. 3 is a cross sectional view of an alternate structural unit body in which the structure of the frame is modified as compared to that in FIG. 1.

In the embodiment of FIG. 3, a metal sheet having holes 32 is used as the base 35, however, a metal net formed of strong and thick wire may be used instead of the base 35. The quality of material of each part used is the same as that of the previous or first embodiment. The buffer material 33 with which the box 34 for the base 35 is stuffed may be a resilient body of antiseptically treated wood, plywood or synthetic resin.

Since the structural unit body of the invention having a pipe incorporated therein is not only strong and resilient because of that its stepped frame itself and resilient in its box 5 is stuffed with noncombustible materials but also reinforced on the outside with cement mortar 16, the whole of the unit body can strongly resist shock from outside and is solid. Even if the front and back sides of the mortared unit body are exposed to temperature and moisture differences from the outside, the stuffed box serves also as a buffer zone as regards the temperature and hence there is little possibility of the unit body producing cracks and being damaged. For example, when the air is high in moisture content because of rain and snow, the moisture that permeates the interior of the unit body through the mortared layer is absorbed by the square box enclosing the inorganic fibers through atomization by the action of air between the inorganic fibers or through the action of capillary phenomenon and is attenuated by the air in the metal net portion. Accordingly, the temperature of the fluid passing through the pipe 12 disposed inside the box is hardly influenced, with the result that the fluid is always allowed to retain a substantially constant temperature. A structure which is assembled, in suitable combination, with the unit bodies hereinabove described and connected by the use of connection plates, as hereinafter described is earthquake resistant in that the structure on the whole forms walls and floors adaptable to resist vibration. Furthermore, the structure has elastic, soft, fireproof and shockproof properties.

Figure 4:
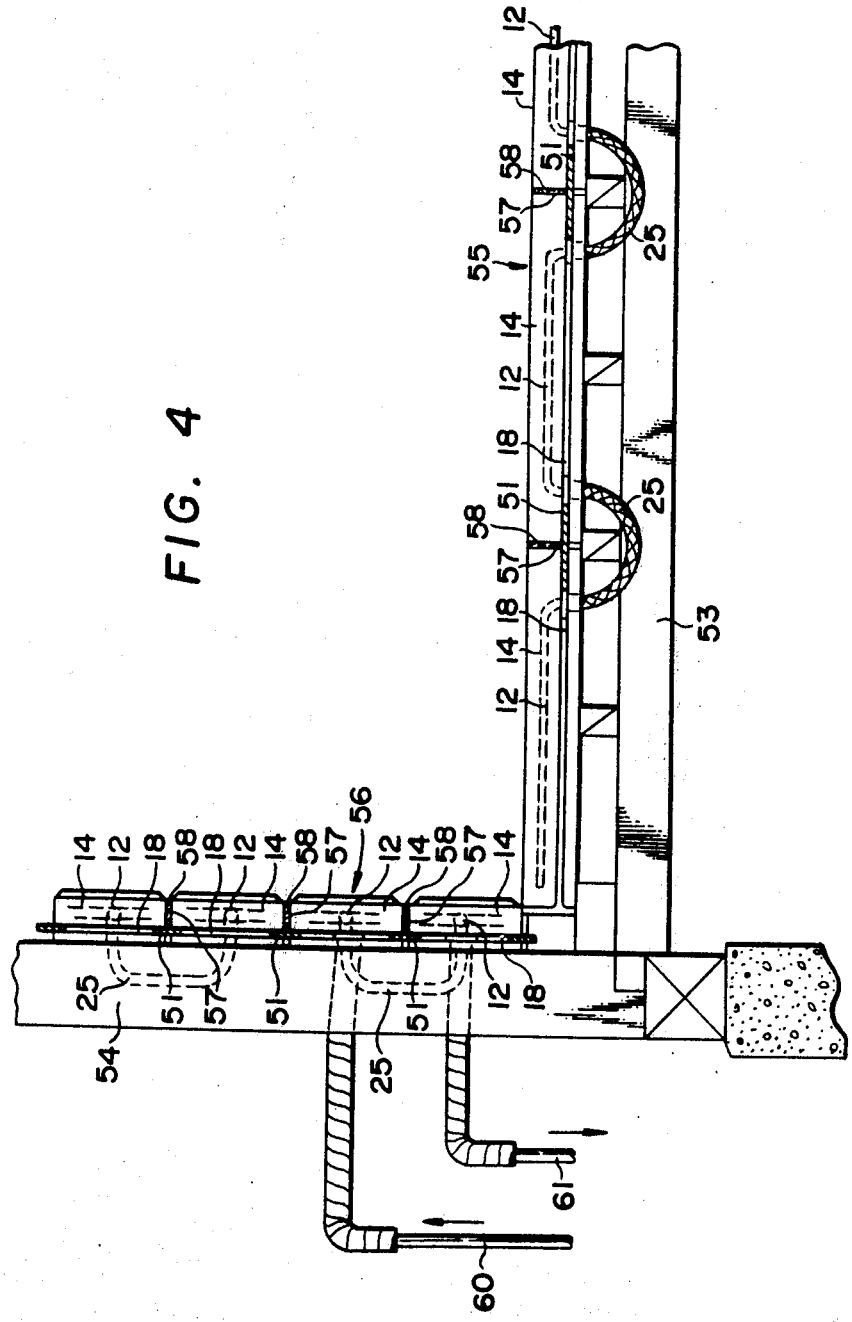
FIG. 4 is an elevational view of the side of a portion of a structure which is assembled with the structural unit bodies.
Figure 5:
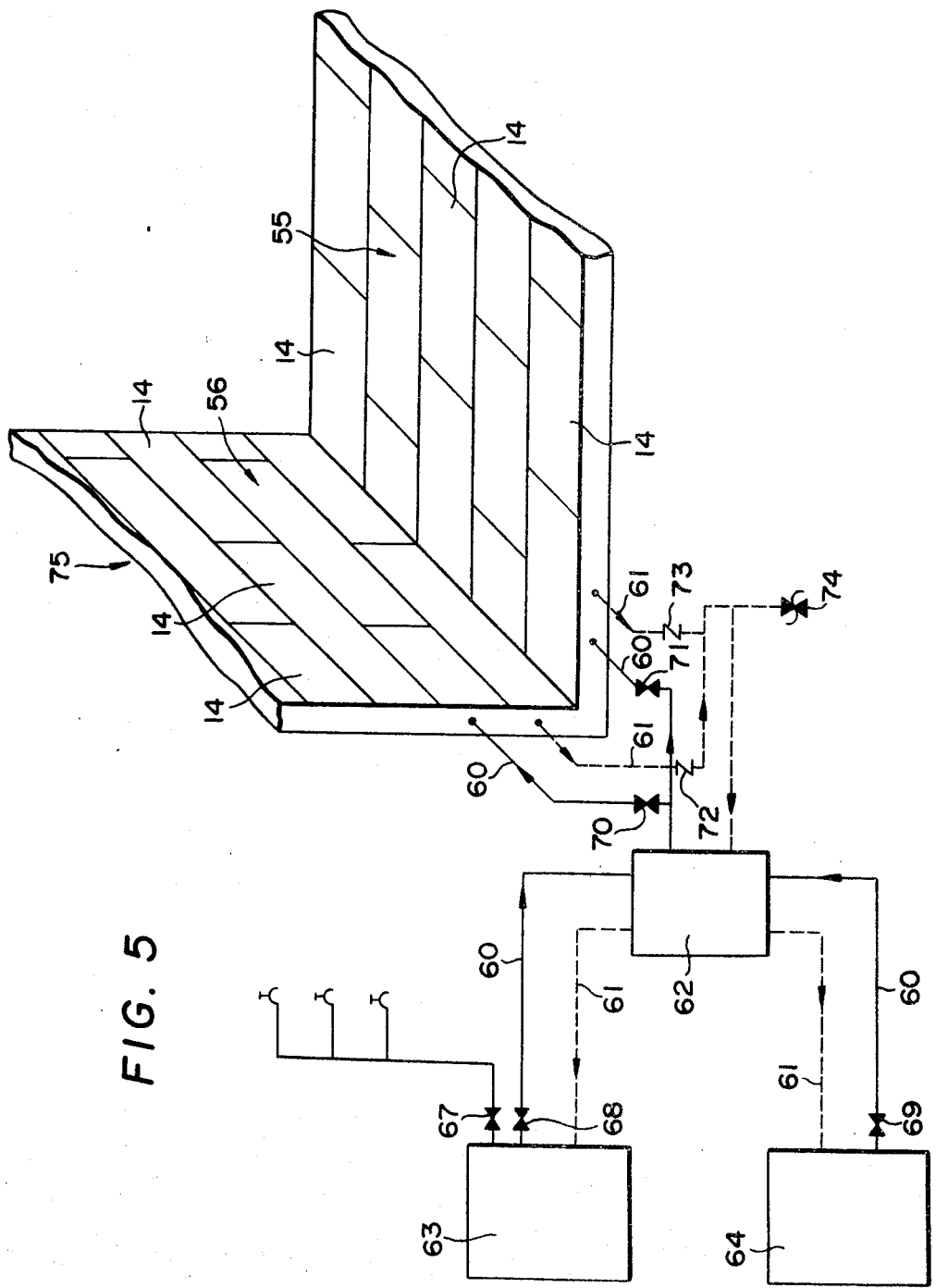
FIG. 5 is a flow diagram showing an example of the circulating path of the fluid flowing through the piping.

FIG. 4 shows a structure assembled of the structural unit bodies described in either of the two preceding embodiments and having a pipe incorporated therein. This structure is assembled by connecting structural unit bodies 14 or 40 having the pipe incorporated therein or both bodies suitably combined or affixed to a floor base 53 and wall base 54. In FIG. 4, only the structural unit body 14 alone is described. When the unit bodies are connected to each other, the outlet 20 of the pipe of an adjacent unit body is connected through a flexible connection pipe 25 to the inlet 19 of the pipe 12 shown in FIG. 2. In connecting the unit bodies, connection plates 51 are inserted into the circumferential grooves 18 of adjacent unit bodies 14 and floor portions 55 and walls 56 are successively laid by repetition of the same method of construction. Mortar 57 is filled in or placed in the joints between the unit bodies as shown in FIG. 4 to thereby strengthen the connection of structural unit bodies with the whole of the structure. Elastic joints 58 are applied to the joint portions where necessary, or the finish is effected with mortar. A feed pipe 60 and a return pipe 61 are brought into communication, respectively with an inlet and an outlet of each of the pipes therein when the floor portion 55 is connected with the wall portion 56. As shown in the example of piping in the structure 75 in FIG. 5, the feed pipe 60 and return pipe 61 are connected through a circulating pump 62 to a hot water feeder supply 63 and a cooling tower or cooling water supply 64 and operating valves 67, 68, 69, 70 and 71 and check valves 72 and 73 are located at the required places along the pipes 60 and 61. A drain cock 74 is also provided. In order to heat a room, hot water from the hot water feeder supply 63 is caused to flow via the circulating pump 62 from the feed pipe 60 through the series of pipes laid inside the floor portion 55 and wall portion 56. Because the hot water circulates through the piping by the action of the circulating pump 62, it emits heat from the floor portion 55 and the wall 56 to thereby warm or heat the room. When the temperature of the room drops, introduction or return of hot water from the circulating pump 62 into the hot water feeder supply 63 results in the feeder 63 heating up the hot water and the latter circulates again through the pipe. When dust or dirt is collected in the hot water or the latter becomes old, it is only necessary to open a drain cock 74 and discharge the hot water. It is economical to include a kitchen, bathroom and other supply points of hot water along the path of circulation of the hot water. In cooling rooms, it is only necessary to close an operating valve 68 at the hot water feeder supply 63 and to circulate cold water from a cooling tower or cooling water supply 64 in the same manner as previously described.

As shown in FIG. 4, the pipe between the structural unit bodies may be replaced with a flexible communication pipe by which the floor portion 55 is connected with the wall portion 56. In this case, it is only necessary to provide the feed pipe 60 and return pipe 61 at one place either in the floor portion 55 or in the wall portion 56. When a connection between the floor portion 55 and the wall portion 56 is not made by the communication pipe 25, a feed pipe and return pipe are disposed in the floor portion 55 and the wall portion 56 respectively. Because mortar 57 is filled in a disposed between the adjacent structural unit bodies, the unit bodies thus filled in with mortar therebetween appears as if they were one whole sheet, and hence strong and effective as regards heat transfer. In this manner, connection of the ends of the pipe 12 by the flexible communication pipe 25 makes it possible not only to prevent trouble due to vibration, but also to make effective use of heat by utilizing a hot water feed piping system. For example, hot water from the return pipe may be diverted to a bathtub or, the hot water may be diverted to hot washing water or to some work in which the heat from the hot water is used by changing over the circulation path of the hot water. By use of the structural unit bodies of the invention it is possible to provide a structure which does not require the installation of any heat radiating appliance and device in the rooms and on the floors, and accordingly renders it possible to make much more effective use of room space and removes the possibility of air pollution in the rooms, thereby resulting in a hygienic and comfortable environmental living conditions.

I claim:

1. A construction arrangement for a structure such as a wall or floor comprising a unit body, said unit body including a frame having an outer flange and an inner flange, said inner flange circumscribing an opening in said frame, a stuffing box, a noncombustible material within said stuffing box, means securing said stuffing box to said frame to thereby close said opening, cement mortar disposed on at least portions of said stuffing box and said frame, said cement mortar being arranged relative to said outer flange so as to form a circumferential groove between said cement mortar and said outer flange, conduit means disposed within said stuffing box for conducting a fluid, means securing a plurality of said unit bodies to said structure in an arrangement whereby said plurality of unit bodies are arranged adjacent to one another so that a portion of the circumferential groove of one unit body faces a portion of the circumferential groove of another adjacent unit body, and interconnecting means disposed in said circumferential grooves for interconnecting said adjacent unit bodies to one another, and connecting pipe means connecting the conduit means of adjacent unit bodies to each other.

2. A construction arrangement according to claim 1 wherein said interconnecting means comprises an interconnecting plate, and joining material between adjacent unit bodies to join and fix the latter to one another.

3. A construction arrangement according to claim 1 wherein said connecting pipe means includes flexible pipes, each of said conduit means including and inlet and an outlet, a feed pipe connected to at least one of said inlets, a return pipe connected to at least one of said outlets, a source of fluid, and circulating pump means for supplying a fluid to said feed pipe from said source and for returning said fluid from said return pipe to said source.

4. A construction arrangement according to claim 3 wherein said source of fluid provides hot water to said feed pipe.

5. A construction arrangement according to claim 3 wherein said source of fluid provides cooling water to said feed pipe.

* * * * *